(12) United States Patent
Suzuki

(10) Patent No.: US 7,512,184 B2
(45) Date of Patent: Mar. 31, 2009

(54) RECEIVER AND RECEPTION METHOD WITH CHANNEL ESTIMATION USING SMOOTHING AND DECIMATION FAST FOURIER TRANSFORM (FFT)

(75) Inventor: Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 827 days.

(21) Appl. No.: 10/911,597

(22) Filed: Aug. 5, 2004

(65) Prior Publication Data

US 2005/0069047 A1    Mar. 31, 2005

(30) Foreign Application Priority Data

Aug. 19, 2003   (JP) .......................... P2003-294956

(51) Int. Cl.
*H04K 1/10*   (2006.01)

(52) U.S. Cl. ...................................... 375/260; 370/208

(58) Field of Classification Search ............... 375/260; 370/208

See application file for complete search history.

(56) References Cited

U.S. PATENT DOCUMENTS 6,111,536 A * 8/2000 Richards et al. ............. 342/125
6,990,061 B2 * 1/2006 Deneire et al. .............. 370/210
7,161,896 B1 * 1/2007 Hart et al. ................... 370/206
2002/0122381 A1 * 9/2002 Wu et al. .................... 370/208
2004/0059766 A1 * 3/2004 Yeh ............................ 708/406

OTHER PUBLICATIONS

Anuj Batra, "TI Physical Layer Proposal for IEEE 802.15 Task Group 3a", IEEE May 12, 2003. This document can be founf at http://grouper.ieee.org/groups/802/15/pub/2003/May03/03142r2P802-15_TG3a-TI-CFP-Document.doc (see specification p. 7 paragraph [0016] of the present application).*

Proakis, "Introduction to Digital Signal Processing", Macmillan, 1988 section 4.5.2 pp. 280-282.*

* cited by examiner

*Primary Examiner*—Juan A Torres
(74) *Attorney, Agent, or Firm*—Oblon, Spivak, McClelland, Maier & Neustadt, P.C.

(57) ABSTRACT

A receiver performs an inverse Fast Fourier Transform (FFT) on a plurality of carriers to receive an Orthogonal Frequency Division Multiplexing (OFDM) signal to be transmitted by converting a signal along a frequency-domain into a signal along a time-domain. The receiver includes a frequency response acquisition section configured to acquire a frequency response from the received OFDM signal. The receiver also includes a smoothing section configured to produce a smoothed frequency response from the frequency response, a decimation section configured to decimate a number of points from the smoothed frequency response to produce a decimated frequency response including points corresponding to a path that is reached first, and a time response acquisition section configured to acquire a time response from the decimated frequency response including the points corresponding to the path that is reached first.

14 Claims, 4 Drawing Sheets

RECEIVER AND RECEPTION METHOD WITH CHANNEL ESTIMATION USING SMOOTHING AND DECIMATION FAST FOURIER TRANSFORM (FFT)

BACKGROUND OF THE INVENTION

1. Field of the Invention

The present invention relates to a receiver and a reception method for receiving wireless transmission signals. More specifically, the present invention relates to a receiver and a reception method for receiving OFDM (Orthogonal Frequency Division Multiplexing) signals which are transmitted by applying inverse Fast Fourier Transform (FFT) to a plurality of carriers to convert carriers along the frequency-domain into signals along the time-domain.

Still more specifically, the present invention relates to a receiver and a reception method for estimating channel characteristics during OFDM signal decoding and particularly to a receiver and a reception method for performing inverse FFT for ranging and estimating channel characteristics of time response.

2. Description of Related Art

Special attention is paid to wireless Local Area Network (LAN) as a system to free users from cabling of hardwired LANs. The wireless LAN can eliminate most of cables in working spaces such as offices. Accordingly, it is possible to relatively easily move communication terminals such as personal computers (PCs). In recent years, there is a remarkably increasing demand for wireless LAN systems as they achieve higher speed and become available at reduced costs. Recently, introduction of a personal area network (PAN) is especially being considered to construct a small-scale network for information communication between electronic devices available around users. For example, there are provided different wireless communication systems and wireless communication apparatuses using frequency bands such as 2.4 GHz and 5 GHz bands that need not be licensed by governing legal authorities.

In recent years, for example, attention is focused on the "ultra wide band (UWB) communication" as a wireless communication system capable of short-distance, ultrafast transmission. The system performs wireless communication by carrying information on very weak impulse sequences. It is expected to put the system into practical use. Presently in IEEE802.15.3 and the like, there are devised data transmission systems having the packet structure including preambles as access control systems for ultra wide band communication.

If a wireless network is constructed under a working environment where many devices are mixed in a room, it is possible to suppose that a plurality of networks are constructed in an overlapping fashion. A wireless network using a single channel cannot provide any countermeasure against a case where another system interrupts during communication or an interference occurs to degrade the communication quality. To solve this problem, there is proposed a multi-channel communication system that provides a plurality of frequency channels and uses one of the frequency channels to operate. If an interference occurs to degrade the communication quality during communication, for example, a technique called frequency hopping is used to maintain network operations, enabling coexistence with the other networks.

When a wireless network is constructed in a room, receivers form a multipath environment to receive an overlap of a direct wave and a plurality of reflected waves or delay waves. Multipath generates a delay distortion (or frequency selective fading) to cause a communication error. Further, a delay distortion causes inter symbol interference.

A major countermeasure against delay distortion can be a multi-carrier transmission system. The multi-carrier transmission system transmits data by dividing it into a plurality of carriers having different frequencies. Each carrier uses a narrow band and is hardly subject to frequency selective fading.

For example, the OFDM (Orthogonal Frequency Division Multiplexing) system, one of multi-carrier transmission systems, configures a frequency of each carrier so that the carriers become orthogonal to each other in a symbol region. During information transmission, the system converts serially transmitted information into parallel information at a symbol frequency lower than the information transmission rate. The system allocates a plurality of pieces of output data to each carrier, modulates the amplitude and the phase for each carrier, and performs the inverse FFT for the carriers. In this manner, the system converts the carriers into signals along the time-domain by maintaining the orthogonality of each carrier along the frequency-domain. The reception occurs in the reverse order of the transmission. The system performs the FFT to convert signals along the time-domain into those along the frequency-domain and demodulates the carriers in accordance with the modulation of each carrier. The system performs parallel-serial conversion to reproduce the information that was originally transmitted in the serial signals.

The OFDM modulation system is adopted as a wireless LAN standard in the IEEE802.11a/b, for example. The IEEE802.15.3 standardization is also in progress for the UWB communication system using the OFDM modulation system in addition to the Direct Sequence-Ultra-Wide Band (DS-UWB) system and the impulse-UWB system. The DS-UWB system increases spread speeds of DS information signals to the utmost limit. The impulse-UWB system uses impulse signal sequences having very short frequencies of several hundred picoseconds to configure information signals for transmission and reception. The OFDM_UWB communication system investigates an OFDM modulation that performs frequency hopping (FH) for a frequency band of 3.1 through 4.8 GHz into three sub-bands each comprising 528 MHz bandwidths and uses IFFT/FFT with frequency band comprising 128 points (e.g., see non-patent document 1).

On the other hand, the UWB communication uses ultra narrow pulses to provide high time resolution. This property can be applied to ranging for radar and positioning. In particular, the latest UWB communication can provide both high-speed data transmission over 100 Mbps and the intrinsic ranging function at the same time (e.g., see patent document 1).

In the future, it is expected that WPAN (Wireless Personal Access Network) for near field communication represented by the UWB communication is installed in all household electrical goods and CE (Consumer Electronics) devices. Therefore, in addition to the high-speed data transmission, it is considered to use position information based on the ranging, e.g., provide wireless added values such as navigation and Near Field Communication (NFC). It may be desirable to provide not only the high-speed data transmission, but also the ranging function.

For example, the UWB communication standardization in IEEE802.15.3 includes the UWB ranging technology as well as the OFDM modulation system (e.g., see non-patent document 1).

Generally, a transmission system using OFDM uses a frequency region for channel characteristic estimation that is performed reception and decoding. In this case, the receiver receives signals along the time-domain for data transmission and performs FFT to convert the received signals into signals along the frequency-domain. The receiver then extracts OFDM sub-carriers as mentioned above. Signals after FFT can be used for the channel characteristic estimation. However, the ranging requires a channel estimation value for time response, thus necessitating inverse FFT (see FIGS. 3 and 4).

The inverse FFT for ranging is a process independent of the intrinsic data transmission and therefore increases the receiver's load. When the FFT function for transmission is also used for the channel characteristic estimation, the FFT uses the large number of points similarly to ordinary reception, increasing the process amount.

For example, let us assume that a broadband channel characteristic estimation is performed using all bands in an OFDM modulation communication system that performs multiband frequency hopping. In such case, the FFT needs to use the larger number of points, complicating the apparatus. When an OFDM modulation system operates in 3-band mode where each frequency band comprises 128 points, it just needs to use the 128 points FFT for ordinary data reception. If the ranging uses all bands, it is necessary to use the 384 points FFT, three times larger than the size for the data transmission.

[Patent document]
Japanese Translation of Unexamined PCT Appln. 2002-517001.

[Non-patent document]
IEEE802.15.3a TI Document <URL:http://grouper.ieee-.org/groups/802/15/pub/2003/May03 filename: 03142r2P802-15_TI-CFP-Document.doc>

SUMMARY OF THE INVENTION

It is an object of the present invention to provide an excellent receiver and reception method capable of appropriately estimating channel characteristics while OFDM signals are decoded.

It is another object of the present invention to provide an excellent receiver and reception method capable of performing an inverse FFT for ranging and efficiently estimating channel characteristics for time response.

It is yet another object of the present invention to provide an excellent receiver and reception method capable of efficiently estimating channel characteristics of time responses using fewer FFT points than for ordinary data reception.

The present invention has been made in consideration of the foregoing and provides a receiver which performs an inverse FFT on a plurality of carriers to receive an OFDM signal to be transmitted by converting a signal along a frequency-domain into a signal along a time-domain. The receiver comprises:

frequency response acquisition means for acquiring a frequency response from a received OFDM signal;

smoothing means for smoothing the frequency response;

decimation means for decimating the number of points for the smoothed frequency response; and time response acquisition means for acquiring a time response for the number of points decimated from the frequency response.

In this context, the frequency response acquisition means represents, for example, an FFT that converts signals along the time-domain into those along the frequency-domain. The time response acquisition means represents an inverse FFT that converts signals along the frequency-domain into those along the time-domain.

As mentioned above, it is highly possible that the UWB standardization adopts OFDM systems. A transmission estimation section inevitably acquires estimation values for a frequency region. On the other hand, the ranging is a representative feature of the UWB and requires channel estimation values for time response. For this reason, an inverse FFT needs to be performed for conversion.

According to the present invention, frequency region smoothing means is used for time response limitation to prevent additional large FFTs from being provided for the ranging. It is therefore possible to acquire time responses using fewer FFT points than for ordinary data reception.

The present invention can provide an excellent receiver and reception method capable of appropriately estimating channel characteristics while OFDM signals are decoded.

Further, the present invention can provide an excellent receiver and reception method capable of performing an inverse FFT for ranging and efficiently estimating channel characteristics for time response.

Moreover, the present invention can provide an excellent receiver and reception method capable of efficiently estimating channel characteristics of time responses using fewer FFT points than for ordinary data reception.

These and other objects and novel features of the present invention may be readily ascertained by referring to the following more detailed description based on an embodiment of the present invention and appended drawings.

DETAILED DESCRIPTION OF THE PREFERRED EMBODIMENTS

An embodiment of the present invention will be described in further detail with reference to the accompanying drawings.

Figure 1:
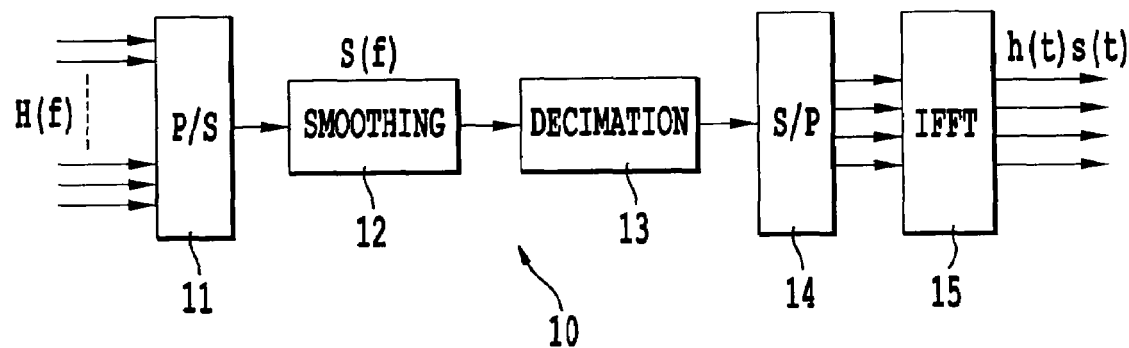
FIG. 1 schematically shows a configuration of an OFDM_UWB receiver according to an embodiment of the present invention.

FIG. 1 schematically shows a configuration of a receiver 10 that performs data reception and ranging under communication environment where the UWB communication system adopts the OFDM modulation for wireless transmission. For simplicity of drawing, FIG. 1 diagrams only function blocks that extract time responses for ranging.

Figure 5:
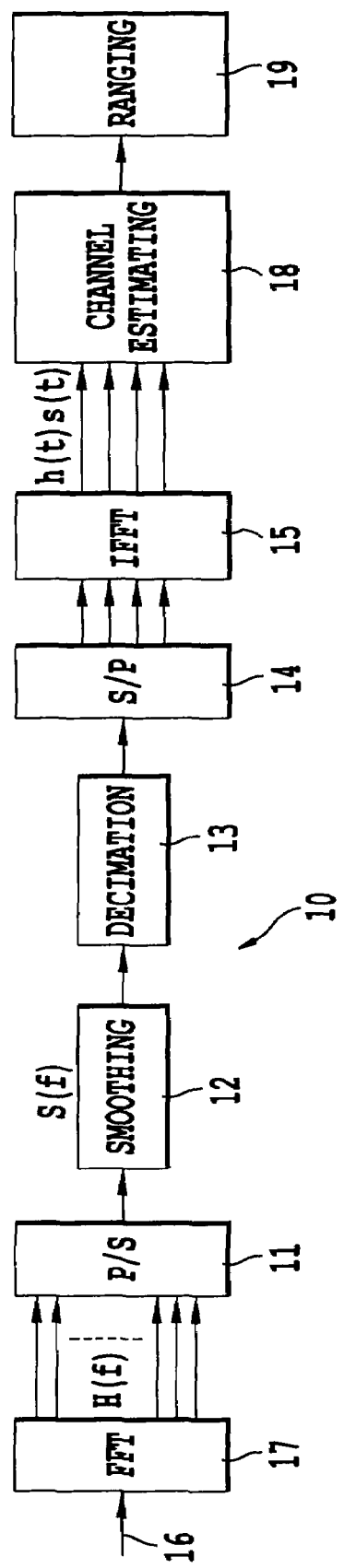
FIG. 5 shows a block diagram of an embodiment of the present invention.

FIG. 5 shows another configuration of receiver 10 including an FFT 17, channel estimating section 18, and ranging section 19. The FFT 17 converts a signal 16 received as one along the time-domain into a signal along the frequency-domain. In this example, the number of FFT points is assumed to be 128. A parallel-serial converter 11 serially rearranges 128 frequency signals. A smoothing circuit (Smoothing) 12 smoothes the signals by folding frequency response H(f) with smoothing function S(f).

The ranging just requires the knowledge about the time of a path that is reached first. It is desirable that the smoothing circuit 12 smoothes the frequency response so as to be able to extract time responses approximate to 0 on the time-domain. For example, smoothing function S(f) is determined by using a moving average.

A subsequent decimation circuit (Decimation) 13 decimates the number of points along the frequency-domain. In this example, it is assumed that original 128 points are decimated up to a quarter, i.e., 32 points.

A serial-parallel converter 14 converts serial signals along the frequency-domain into parallel signals. An IFFT 15 extracts time-domain response h(t)s(t).

Since the IFFT 15 needs to perform IFFT for only 32 FFT points, it is possible to efficiently acquire time responses approximate to the targeted time 0.

Figure 2:
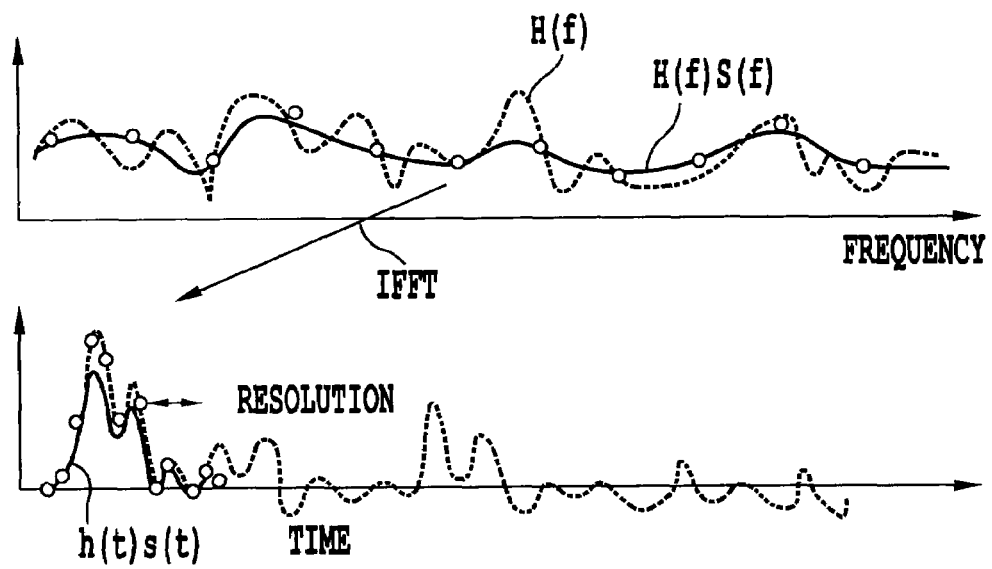
FIG. 2 shows how smoothing function S(f) is folded into original frequency response H (f) for smoothing and how the smoothing and a decimation process acquire a time response approximate to time 0 using a small number of points.
Figure 3:
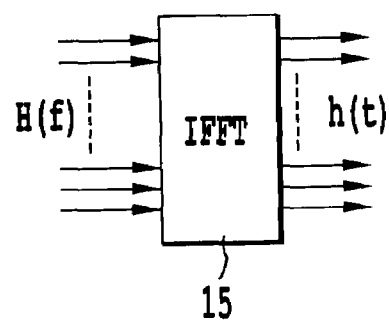
FIG. 3 shows a function block to extract time responses from frequency responses.
Figure 4:
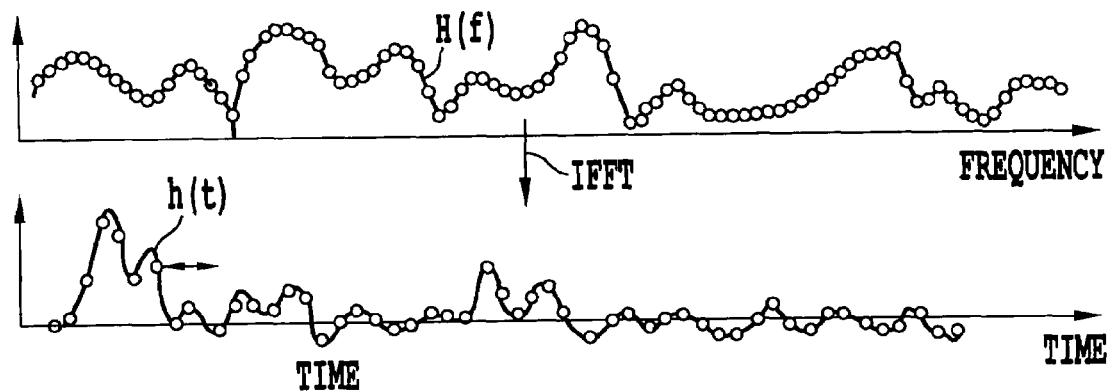
FIG. 4 shows extraction of time responses from frequency responses.

A channel estimating section 18 estimates channel characteristics of a time-domain response, and a ranging section 19 performs ranging based on a channel characteristic estimation value of a time-domain response. FIG. 2 shows how smoothing function S(f) is folded into original frequency response H(f) for smoothing and how the smoothing and a decimation process acquire a time response approximate to time 0 using a small number of points.

Figure 6:
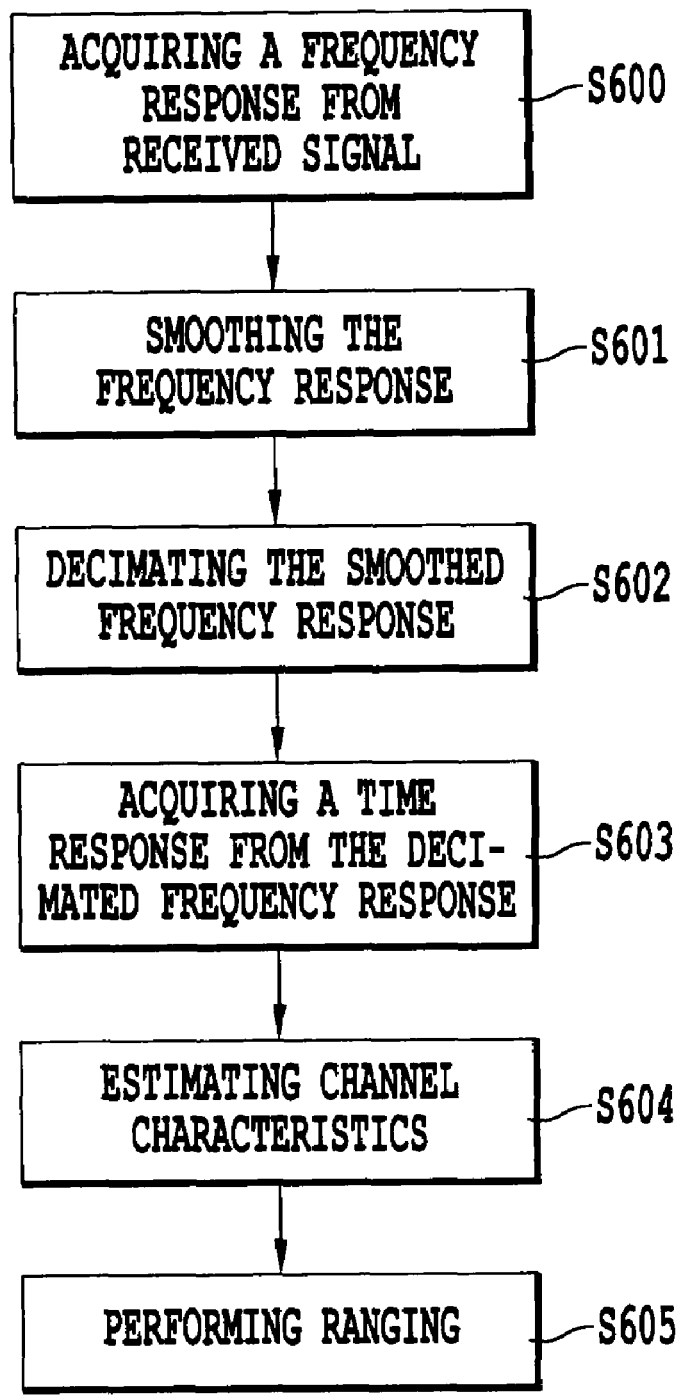
FIG. 6 shows a flow diagram of an embodiment of the present invention.

FIG. 6 is a flow diagram of an embodiment of the invention. Let us suppose a case of finding a time response for the purpose of wireless system ranging in which a channel estimation value is found as a frequency response. As seen from FIGS. 2 and 6, the present invention acquires the frequency response from a received signal (S600), smoothes the frequency response (S601), performs the decimation process to decrease the number of samples (S602), and then performs an inverse FFT and the like for conversion and to obtain a time response from the decimated frequency response (S603), estimate channel characteristics (S604), and perform ranging (S605). Consequently, it is possible to decrease the throughput for converting the frequency region characteristic into the time response.

[Supplement]

There has been described in detail the present invention with reference to the specific embodiment. It is to be distinctly understood by those skilled in the art that various changes and modifications and substitutions may be made in the embodiment without departing from the spirit and scope of the present invention. That is to say, the present invention has been disclosed as an example. The contents of this specification should not be interpreted restrictively. The appended claims should be taken into consideration for evaluation of the gist of the present invention.

What is claimed is:

1. A receiver comprising:
a frequency response acquisition section configured to acquire a frequency response having a first number of points from a received Orthogonal Frequency Division Multiplexing (OFDM) signal;
a smoothing section configured to produce a smoothed frequency response from said frequency response;
a decimation section configured to decimate points from said smoothed frequency response to produce a decimated frequency response including a second number of points corresponding to a path that is reached first; and
a time response acquisition section configured to acquire a channel characteristic of a time response from said decimated frequency response including the second number of points corresponding to the path that is reached first, wherein an ordinary data reception is performed using the frequency response having the first number of points, and the first number of points used in the ordinary data reception is greater than the second number of points used in the acquisition of the channel characteristic of the time response.

2. A receiver comprising:
a frequency response acquisition section configured to acquire a frequency response having a first number of points from a received signal;
a smoothing section configured to produce a smoothed frequency response from said frequency response;
a decimation section configured to decimate points from said smoothed frequency response to produce a decimated frequency response including a second number of points;
a time response acquisition section configured to acquire a channel characteristic of a time response from said decimated frequency response including the second number of points; and
said smoothing section and said decimation section are further configured to respectively smooth and decimate so that said time response acquired by said time response acquisition section includes a time response of approximately 0 in the time domain, an ordinary data reception is performed using the frequency response having the first number of points, and the first number of points used in the ordinary data reception is greater than the second number of points used in the acquisition of the channel characteristic of the time response.

3. The receiver according to claim 1 or 2,
wherein said time response acquisition section further comprises an inverse Fast Fourier Transform (FFT) to convert a signal along a frequency-domain into a signal along a time-domain.

4. The receiver according to claim 1 or 2, further comprising:
a ranging section configured to perform ranging based on the estimated channel characteristics of the acquired time response.

5. The receiver according to claim 1,
wherein said smoothing section and said decimation section perform smoothing and decimation processes so that said time response acquisition section extracts a time response approximate to 0 on a time-domain.

6. A reception method comprising steps of:
acquiring, by a frequency response acquisition section, a frequency response having a first number of points from a received Orthogonal Frequency Division Multiplexing (OFDM) signal;
smoothing said frequency response to produce a smoothed frequency response;
decimating points from said smoothed frequency response to produce a decimated frequency response including a second number of points corresponding to a path that is reached first;
acquiring a channel characteristic of a time response from said decimated frequency response including the second number of points corresponding to the path that is reached first; and
performing an ordinary data reception using the frequency response having the first number of points, the first number of points used in the performing the ordinary data reception being greater than the second number of points used in the acquiring the channel characteristic of the time response.

7. A reception method comprising steps of:
acquiring, by a frequency response acquisition section, a frequency response having a first number of points from a received signal;
smoothing said frequency response to produce a smoothed frequency response;
decimating points from said smoothed frequency response to produce a decimated frequency response including a second number of points;
acquiring a channel characteristic of a time response from said decimated frequency response including the second number of points;
said smoothing and said decimating respectively smooth and decimate so that said acquiring the time response step includes acquiring a time response of approximately 0 in the time domain; and
performing an ordinary data reception using the frequency response having the first number of points, the first number of points used in the performing the ordinary data reception being greater than the second number of points used in the acquiring the channel characteristic of the time response.

8. The reception method according to claim 6 or 7, wherein said acquiring the time response step performs an inverse Fast Fourier Transform (FFT) to convert a signal along a frequency-domain into a signal along a time-domain.

9. The reception method according to claim 6 or 7, further comprising:
performing ranging based on the estimate channel characteristics of the acquired time response.

10. The reception method according to claim 6, wherein said smoothing step and said decimation step perform smoothing and decimation processes so that said acquiring the time response step extracts a time response approximate to 0 on a time-domain.

11. A receiver which performs an inverse Fast Fourier Transform (FFT) on a plurality of carriers to receive an Orthogonal Frequency Division Multiplexing (OFDM) signal to be transmitted by converting a signal along a frequency-domain into a signal along a time-domain, said receiver comprising:
frequency response acquisition means for acquiring a frequency response having a first number of points from the received OFDM signal;
smoothing means for smoothing said frequency response;
decimation means for decimating points from said smoothed frequency response to produce a decimated frequency response including a second number of points; and
time response acquisition means for acquiring a channel characteristic of a time response for the decimated frequency response including the second number of points,
wherein said smoothing means and said decimation means perform smoothing and decimation processes so that said time response acquisition means extracts a time response approximate to 0 on a time-domain, an ordinary data reception is performed using the frequency response having the first number of points, and the first number of points used in the ordinary data reception is greater than the second number of points used in the acquisition of the channel characteristic of the time response.

12. A receiver in a wireless communication system in which a channel estimation value is found as a frequency response having a first number of points, said receiver comprising:
smoothing means for smoothing said frequency response;
decimation means for decimating the number of points for said smoothed frequency response to produce a decimated frequency response including a second number of points; and
time response acquisition means for acquiring a channel characteristic of a time response from the decimated frequency response including the second number of points,
wherein said smoothing means and said decimation means perform smoothing and decimation processes so that said time response acquisition means extracts a time response approximate to 0 on a time-domain, an ordinary data reception is performed using the frequency response having the first number of points, and the first number of points used in the ordinary data reception is greater than the second number of points used in the acquiring of the channel characteristic of the time response.

13. A reception method for performing an inverse Fast Fourier Transform (FFT) on a plurality of carriers to receive an Orthogonal Frequency Division Multiplexing (OFDM) signal to be transmitted by converting a signal along a frequency-domain into a signal along a time-domain, said method comprising the steps of:
acquiring, by a frequency response acquisition section, a frequency response having a first number of points from the received OFDM signal;
smoothing said frequency response;
decimating points for said smoothed frequency response to produce a decimated frequency response including a second number of points; and
acquiring a channel characteristic of a time response from the decimated frequency response including the second number of points,
wherein said smoothing step and said decimation step perform smoothing and decimation processes so that said acquiring step acquires a time response approximate to 0 on a time-domain, an ordinary data reception is performed using the frequency response having the first number of points, and the first number of points used in the performing the ordinary data reception is greater than the second number of points used in the acquiring the channel characteristic of the time response.

14. A reception method for receiving wireless signals in a wireless communication system in which a channel estimation value is found as a frequency response having a first number of points, said method comprising the steps of:
smoothing, by a smoothing section, said frequency response;
decimating points for said smoothed frequency response to produce a decimated frequency response including a second number of points; and
acquiring a channel characteristic of a time response from the decimated frequency response including the second number of points,
wherein said smoothing step and said decimation step perform smoothing and decimation processes so that said acquiring step acquires a time response approximate to 0 on a time-domain, an ordinary data reception is performed using the frequency response having the first number of points, and the first number of points used in the performing the ordinary data reception is greater than the second number of points used in the acquiring the channel characteristic of the time response.

* * * * *